J. REUTHER.
POTATO DIGGER.
APPLICATION FILED JULY 25, 1911.
1,057,172.
Patented Mar. 25, 1913.
2 SHEETS—SHEET 1.
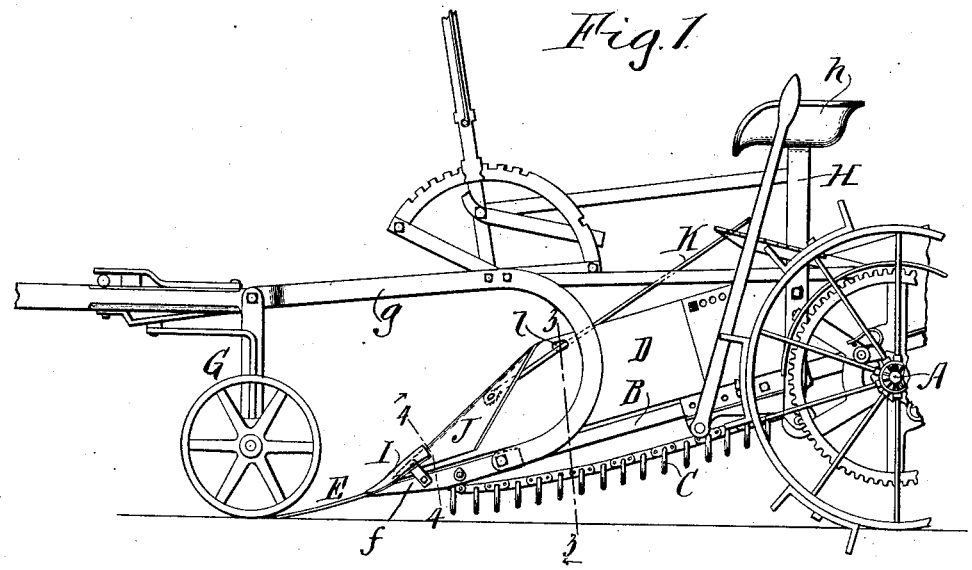
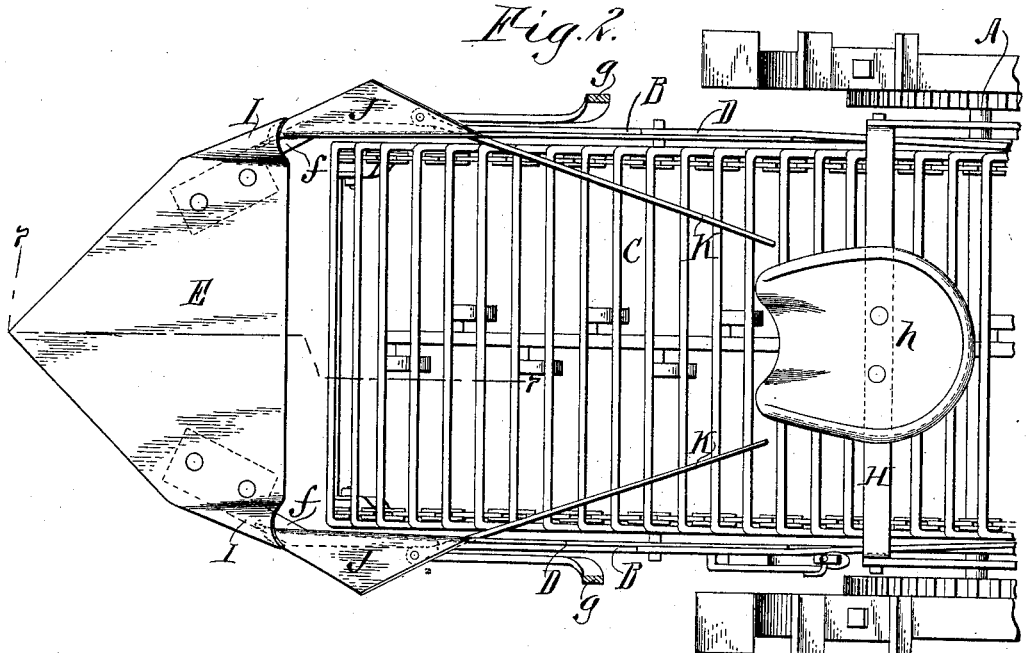

J. REUTHER.
POTATO DIGGER.
APPLICATION FILED JULY 25, 1911.

1,057,172.

Patented Mar. 25, 1913.
2 SHEETS—SHEET 2.

Witnesses:
Richard Sommer
Leroy S. Hodges

Inventor
John Reuther
by Geyer & Popp
Attorneys

UNITED STATES PATENT OFFICE.

JOHN REUTHER, OF EAST AURORA, NEW YORK.

POTATO-DIGGER.

1,057,172.　　　　　Specification of Letters Patent.　　Patented Mar. 25, 1913.

Application filed July 25, 1911. Serial No. 640,391.

*To all whom it may concern:*

Be it known that I, JOHN REUTHER, a citizen of the United States, residing at East Aurora, in the county of Erie and State of New York, have invented new and useful Improvements in Potato-Diggers, of which the following is a specification.

This invention relates to potato diggers of the type having an endless elevator or inclined separator which receives the soil, potatoes and vines from a plow or shovel secured to the front end of the main frame and which usually delivers the potatoes and remaining soil and vines upon a shaker or final separator at the rear of the machine. A digger of this class is shown for example in Letters Patent of the United States No. 967,557, granted to me August 16, 1910. In order to obtain the best results, the material dug up by the plow should be delivered to the elevator in as compact and unbroken a mass as possible. If the lumps of soil are loosened or broken up from any cause before reaching the elevator the potatoes embedded in the loosened soil are released and roll forwardly off the plow, especially in using the machine on down grades; and when this accurs the potatoes are liable to be buried or crushed by the ground wheels or the draft animals.

In machines as ordinarily constructed those potato vines in the path of the extreme sides of the plow are liable to encounter the front ends of the side walls of the elevator and catch thereon, causing the soil upon the side portions of the plow to be loosened or broken up and entailing loss of some of the potatoes. The accumulation of vines at those points also causes clogging of the machine, requiring the operator to stop and back it in order to release the vines and then dismount to remove them.

One object of my invention is to provide the potato digger with efficient means for insuring the free and unobstructed delivery of the vines, as well as the soil and potatoes, from the plow to the elevator, so as to overcome the above-mentioned objections.

Another object is the provision of simple means for keeping the elevated vines out of contact with the seat-supports.

Figure 3:
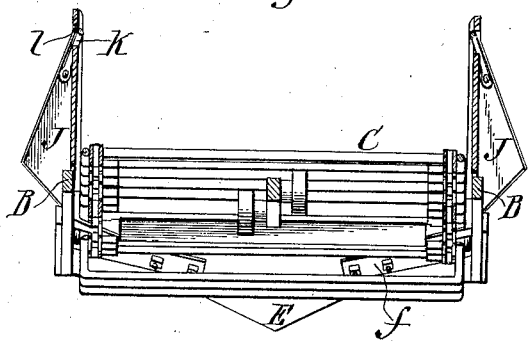
Figure 4:
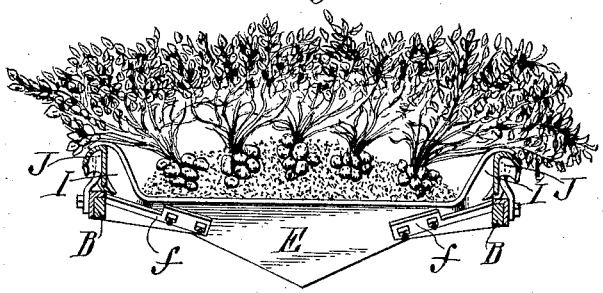
Figure 5:
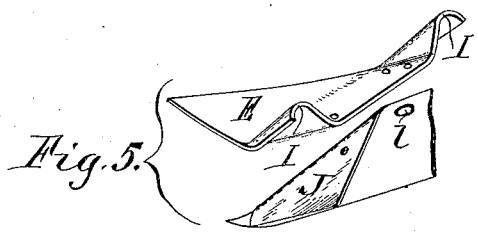
Figure 6:
Figure 7:
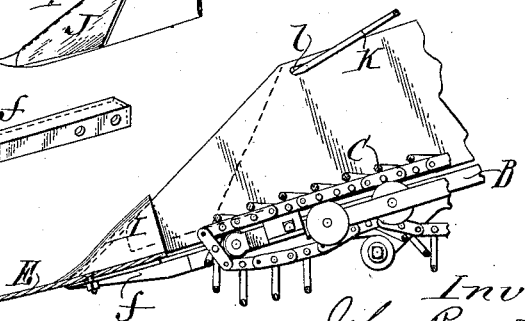

In the accompanying drawings consisting of 2 sheets: Figure 1 is a fragmentary side elevation of a potato digger embodying the invention. Fig. 2 is a fragmentary top plan view thereof. Figs. 3 and 4 are cross sections on the correspondingly numbered lines in Fig. 1. Fig. 5 is a perspective view of the plow and one of the coöperating deflecting wings of the elevator-frame, showing the parts separated for greater clearness. Fig. 6 is a perspective view of one of the plow-supporting arms or brackets. Fig. 7 is a fragmentary vertical longitudinal section on line 7—7, Fig. 2.

Similar letters of reference indicate corresponding parts throughout the several views.

A indicates the axle upon which the usual ground wheels are mounted, and B the longitudinal side bars of the main frame carried by the axle.

C indicates the elevator which may be of any suitable construction, D the stationary side walls of the elevator which are usually of sheet metal and carried by the main frame, and E indicates the plow, shovel or digging blade preferably carried by arms or brackets *f* secured to the front ends of the side bars B.

G indicates a suitable draft truck connected by bars *g* with the main frame, and *h* is the driver's seat preferably mounted on a transverse arch H which spans the elevator and is carried by the side bars B, as more fully described and shown in the aforesaid Letters Patent.

As shown in the drawings, the plow E preferably consists of a pointed triangular blade or plate. This plow is provided at opposite sides of its broad rear portion with potato-vine guides or supports I preferably consisting of convex ridges or rolls which gradually rise from the oblique front or entering edge of the plow to its abrupt rear edge and flare toward the latter edge. Arranged at the upper front ends of the elevator walls D are similar vine-guides and supports J which practically form continuations of the guides I and are preferably overlapped by the rear ends thereof, as best shown in Figs. 2 and 4. The front ends of the walls are beveled or inclined forwardly, and the guides J preferably consist of approximately triangular wings extending outwardly and downwardly from said ends at about the same angle or curvature as the front guides I. As shown, the wings may be formed integral with the sheet metal sidewalls D, and the front guides I may be likewise formed in one piece with the plow.

K indicates supplemental vine guides or deflectors arranged above the elevator and extending rearwardly from the front portions of the side walls D to a point near the front side of the seat support or arch H. These deflectors converge rearwardly and serve to direct the potato-vines toward the center of the elevator as they approach the sides or standards of said arch, thereby preventing the vines from becoming entangled with or being intercepted by said standards. In the preferred construction shown, the deflectors K consist of comparatively stiff rods secured at their front ends to the underside of the guide-wings J and passing through openings $l$ in the side walls D.

In the operation of the machine, the mass of earth, potatoes and vines dug up by the plow passes rearwardly over the latter onto the elevator which separates the potatoes from the earth and vines in a well known manner. The vines at the extreme sides of the plow ride up and overhang the inclined front guides or rolls I which hold and support them in an upright position and they next ride up the rear guides J which continue to hold and support them until they reach the elevator. The vines therefore pass freely and without obstruction from the plow to the elevator, keeping the material in compact masses and preventing forward escape of the potatoes over the plow and consequent loss or crushing of the same.

The abrupt rear ends of the vine-guides and supports I form stops which prevent loosened potatoes at the front of the elevator near its sides from rolling down the plow, enabling the elevator rods to pick up and elevate such potatoes.

I claim as my invention:

1. In a potato digger, the combination of a plow, an elevator arranged to receive the material therefrom and having side walls, and vine guides and supports arranged on the front portions of said walls.

2. In a potato digger, the combination of a plow, an elevator arranged to receive the material therefrom and having side walls, said walls being provided at their front ends with outwardly and downwardly-extending guide and supporting wings for the potato vines.

3. In a potato digger, the combination of a plow, an elevator arranged to receive the material therefrom and having side walls, front vine-supports arranged on the side portions of the plow and rear vine-supports coöperating with said front supports and forming continuations thereof.

4. In a potato digger, the combination of a plow, an elevator arranged to receive the material therefrom and having side walls, front vine supports arranged at the sides of the plow and rising toward the rear edge thereof, and rear vine supports forming continuations of the front supports, said rear vine supports consisting of wings extending outwardly and downwardly from the front ends of said walls.

5. In a potato digger, the combination of a plow, an elevator arranged to receive the material therefrom and having side walls, said walls being provided at their front ends with outwardly and downwardly-extending vine supports, and front vine supports arranged at the sides of the plow, said front vine supports overlapping said wings and sloping toward the front of the plow.

Witness my hand this 17th day of July, 1911.

JOHN REUTHER.

Witnesses:
 WILLIAM E. PIERCE,
 INA B. HOPKINS.

Copies of this patent may be obtained for five cents each, by addressing the "Commissioner of Patents, Washington, D. C."